UNITED STATES PATENT OFFICE.

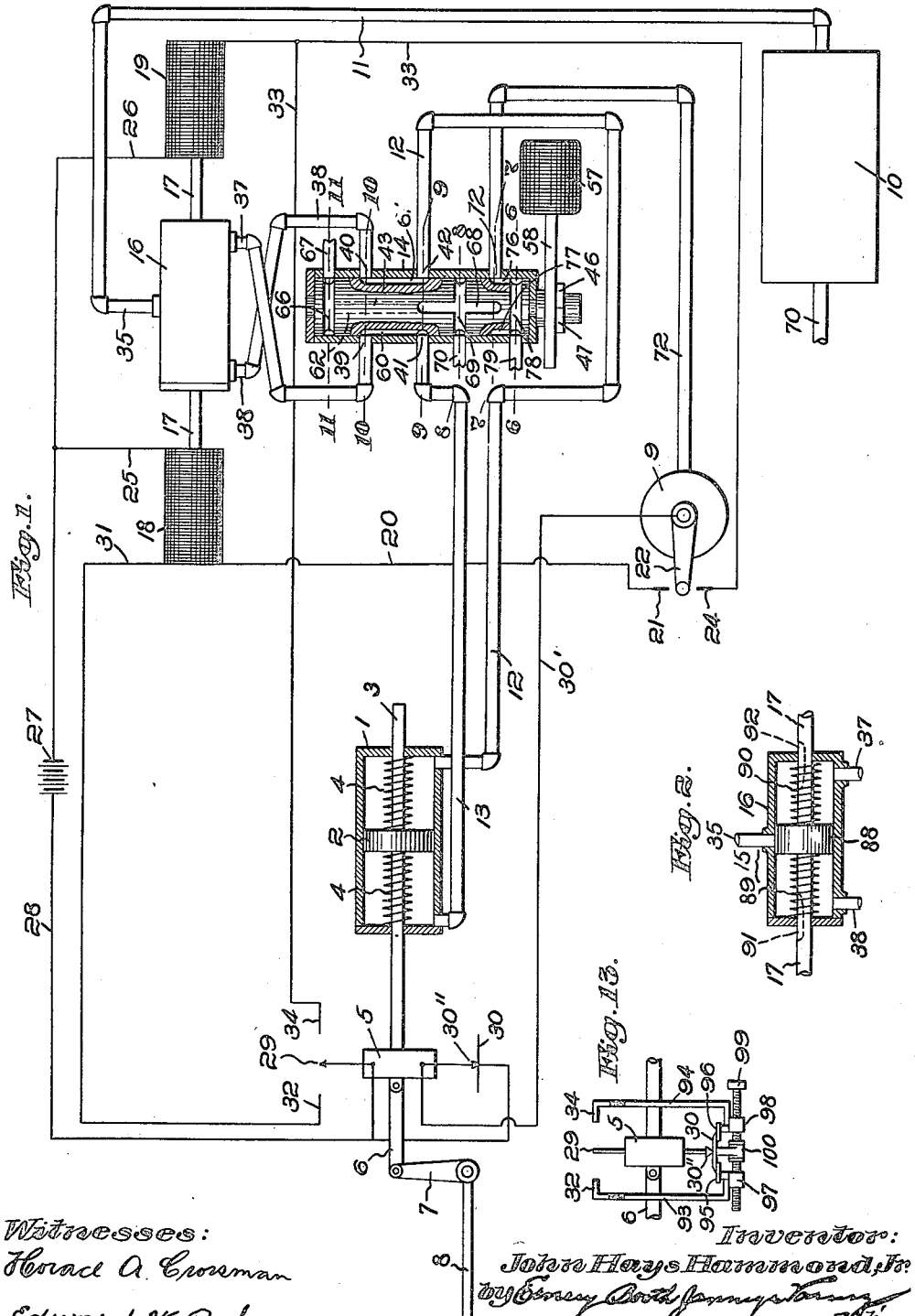

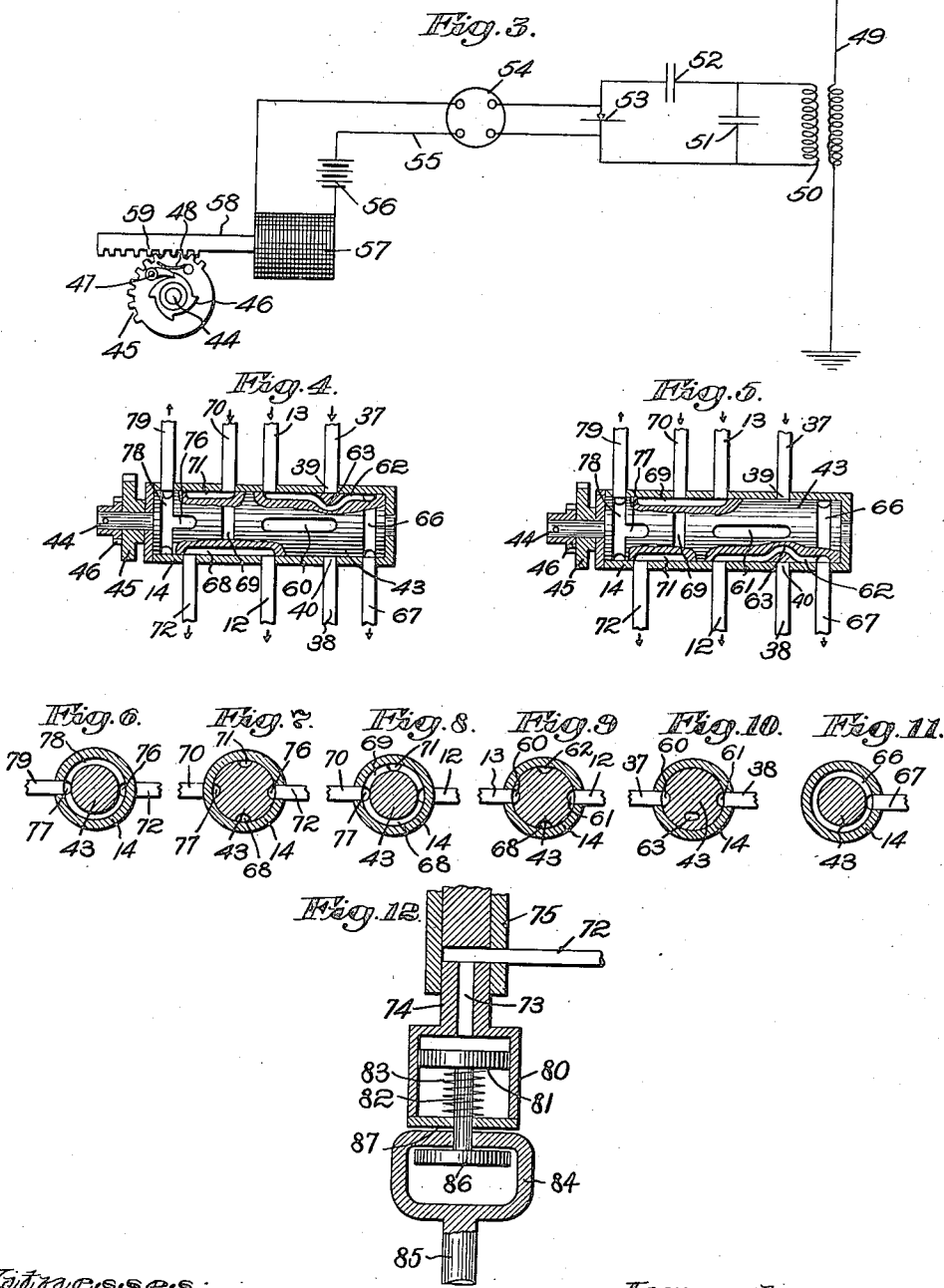

JOHN HAYS HAMMOND, JR., OF GLOUCESTER, MASSACHUSETTS.

SYSTEM FOR CONTROL OF MOVING BODIES BY RADIANT ENERGY.

1,418,792.  Specification of Letters Patent.  Patented June 6, 1922.

Application filed August 6, 1914, Serial No. 855,372. Renewed May 3, 1922. Serial No. 558,311.

*To all whom it may concern:*

Be it known that I, JOHN HAYS HAMMOND, Jr., a citizen of the United States, and a resident of Gloucester, county of Essex, and State of Massachusetts, have invented an Improvement in Systems for Control of Moving Bodies by Radiant Energy, of which the following description, in connection with the accompanying drawings, is a specification, like characters on the drawings representing like parts.

This invention relates to system for controlling and operating moving bodies or mechanisms at a distance, and more particularly to systems in which pneumatic, hydraulic or other fluid pressure or vacuum controlled mechanism for operating the steering gear, engine or other functioning or controlling device or mechanism of moving bodies, is controlled by radiant energy from a distant station.

Within the scope and purpose of the invention, the moving body may be of any suitable type, such, for example, as a vessel, vehicle or air-craft. I have chosen for illustration the application of my invention to the steering of a torpedo or like vessel.

In the accompanying drawings wherein is disclosed a single embodiment of my invention;

Fig. 1 is a view mainly diagrammatic and partially in section, of a system constructed in accordance with and embodying one type of my invention, the gyroscope being represented as functioning in the control of the vessel;

Fig. 2 is a view mainly in longitudinal section, of one type of means for modifying the action of the gyroscope or other controller upon the moving body;

Fig. 3 is a view mainly diagrammatic of one type of means responsive to radiant energy for operating the valve means controlling the flow of motive fluid;

Figs. 4 and 5 are views mainly in vertical section, of said valve means when the vessel is being controlled from a distance;

Figs. 6 to 11 inclusive are cross sections upon the corresponding lines of Fig. 3;

Fig. 12 is a detail in vertical section of one form of means for effecting the functioning of the gyroscope; and Fig. 13 is a detail representing one form of means for adjusting certain of the contacts.

My invention particularly relates to the control of vessels from a distance by radiant energy, preferably in the form of electromagnetic waves, although other types of moving bodies may be so controlled and within the scope of the invention other forms of radiant energy may be employed, such, for example, as light or sound waves. In accordance with the disclosed embodiment of the invention, I provide means whereby the steering apparatus can be controlled or governed at a distance by radiant energy and whereby the vessel may be kept upon a predetermined course at other times by a gyroscope or other suitable controller or azimuth-maintaining means located upon the vessel. During the periods when the vessel is not under the control of an operator at the distant control station, it is maintained upon its course by a suitable controller or azimuth-maintaining means which is herein typified as a gyroscope. Said controller, which I will hereinafter refer to as a gyroscope, may be permitted to function in any suitable manner in maintaining the vessel upon its course, but preferably I employ fluid under pressure, such, for example, as compressed air, and through the agency of said gyroscope I permit compressed air to be admitted into a main or steering cylinder at either side of the piston therein, so as to turn the rudder to starboard or port, as may be required to maintain the vessel upon its course.

I have discovered and in my co-pending application Serial No. 846,468 filed June 22, 1914, I have set forth, that if the motive fluid be admitted by the gyroscope freely and without modification to one side of the steering cylinder, the result is to throw the rudder or other steering device through such a wide angle to starboard or to port, that the vessel tends to move out of its course, whereupon, through the action of the gyroscope, the motive fluid is admitted to the other end of the steering cylinder and the rudder is thereupon thrown through a wide angle in the opposite direction, thus moving the vessel out of its course in the opposite direction. The result is that the vessel tends to move in a sinuous path, the general direction or axis of which is or may be the predetermined direction.

In that embodiment of my invention shown in my said co-pending application, I have represented a system in which the control of the steering means is largely obtained through the instrumentality of fluid under pressure. In this application I have represented a simpler system wherein the control of the steering mechanism is largely effected through electrical connections by which the operation of fluid under pressure is controlled or governed.

I have, therefore, in accordance with the present invention, provided a simpler system including means to modify, limit or restrict the angle through which the rudder is moved upon each functioning of the gyroscope, thus flattening or largely reducing the sinuosity of the path of the vessel and maintaining it much more nearly in its predetermined course.

Referring more particularly to the drawings wherein I have represented merely one embodiment of means for carrying out my invention, I have therein represented the main or steering cylinder at 1, it being provided with a piston 2 carried by a piston rod 3 extending entirely therethrough. The piston rod 3 is surrounded by coil springs 4 upon opposite sides of the piston 2, thereby tending to restore the piston to central position within the cylinder. The piston rod 3 is represented as suitably connected to a cross-head 5 which, in turn, is pivotally connected through a suitable link 6 with a lever 7 coaxially with which is mounted the rudder or steering device 8, here diagrammatically indicated.

I have diagrammatically indicated a gyroscope or other suitable controller or governing device at 9, it being equipped with means whereby when the vessel deviates from its course in either direction, motive fluid is admitted into the cylinder 1 upon the proper side of the piston 2.

The motive fluid preferably employed is air under pressure. I have herein represented a suitable reservoir 10 from which air under pressure is conveyed through a passage 11, by means of valve devices to be hereinafter described, into opposite ends of the cylinder 1. For this purpose I have provided passages 12 and 13, leading to and communicating with opposite ends of the steering cylinder 1, the passage of motive fluid through said passages being controlled by suitable valve means which may be and preferably are similar to those shown in my said co-pending application.

Preferably between the main or steering cylinder 1 and the reservoir 10, I interpose two functioning devices through the action of one of which I either permit the gyroscope to function in the control of the vessel, or permit the operator at the distant control station to steer the vessel; and through the other of which I modify the helm angle or angle through which the rudder moves when the vessel is controlled by the gyroscope and not by the operator, at the distant control station. Preferably the construction of parts is such that when the gyroscope is functioning in the control of the vessel, the modifying devices function to limit the helm angle, and when the gyroscope is not functioning the said modifying means is rendered inactive and the rudder is moved through a wider and preferably through a full angle, through the means responsive to the distant control station.

The first of these functioning devices is indicated, in this embodiment of my invention, at 14, it preferably being a rotary valve of the general type and construction disclosed in my said co-pending application. The second of said functioning devices and which is controlled or governed electrically, is herein indicated generally at 15, it being preferably a suitable valve mechanism for modifying, limiting or restricting the angle through which the rudder is moved when the course of the vessel is controlled by the gyroscope, and being preferably of the general construction shown in said co-pending application. Before describing said functioning devices in detail, I will set forth the operation of the system as a whole.

Within the casing 16 of the valve mechanism 15, is mounted a plunger or piston 17 extending through the opposite ends thereof and constituting also the core or plunger of two solenoids 18, 19. From the solenoid 18 leads a conductor 20 having a terminal 21 in proximity to the arm 22 of the gyroscope 9. From the solenoid 19 leads a conductor 23 provided with a terminal 24 also in proximity to said arm 22, but at the side thereof opposite the terminal 21. Upon apparent movement of the gyroscope arm 22 in either direction, that is, upon deviation of the vessel from its predetermined course, contact is made by the arm 22 with either the terminal 21 or the terminal 24 thereby to effect energization of the corresponding solenoid 18 or 19.

Also leading from the solenoids 18 and 19 are conductors 25, 26, which are in circuit as shown, with a battery 27 or other suitable source of motive power. Leading from the battery 27 is a conductor 28 having two terminals 29 and 30, the former extending from the cross-head 5 and the latter being stationarily mounted preferably in proximity thereto. The terminal 29 is indicated as a suitable wire but the terminal 30 is preferably a bar or other suitable member of considerable extent in a direction longitudinally of the cylinder 1 so that contact may be made with said terminal 30 throughout a considerable portion of the movement of the piston 2 in said cylinder 1.

Extending from the gyroscope 9 is a conductor 30′ which extends to and is supported near one end upon the cross-head 5. The said conductor is there provided with a suitable terminal 30″ which is adapted to make contact with the elongated terminal 30 and to slide therealong in the movements of the cross-head 5 to the right or to the left.

Also leading from the solenoid 18 is a conductor 31 extending into suitable proximity to the movable terminal 29 and provided with a suitable terminal 32 at one side of and in the path of movement of, said terminal 29. Extending from the solenoid 19 is a conductor 33 extending into suitable proximity to said movable terminal 29 and there provided with a suitable terminal 34 also in the path of movement of the terminal 29 but at the side thereof opposite the terminal 32.

Upon movement of the piston rod 3 to the right or left, viewing Fig. 1, the terminal 29 will make contact with the terminal 32 or the terminal 34 and thereby effect energization of the solenoid 18 or the solenoid 19. The contact of the terminals 30, 30″ effects energization of the solenoid 18 when the arm 22 of the gyroscope 9 makes contact with the terminal 21 and when the piston 2 is between the center of the cylinder 1 and the left hand end thereof, and the contact of the terminals 29 and 34 effects energization of the solenoid 19 when the arm 22 of the gyroscope 9 makes contact with the terminal 24, when the piston 2 is between the center of the cylinder and the right hand end thereof. As set forth more fully hereinafter, this causes fluctuating movements of the rudder, the piston 2 being then at the right-hand portion of the cylinder 1. When, however, the piston 2 is nearer the left-hand end of the cylinder 1, then the contact of the terminals 30, 30″ effects energization of the solenoid 19 by reason of the contact of the gyroscope arm 22 with the terminal 24. Such energization continues until the contact is broken at the left-hand end of the terminal 30 whereupon the terminals 29, 32, contact and the solenoid 18 is energized. Thus fluctuating movements of the rudder are caused with the piston 2 in the left-hand end portion of the cylinder 1.

Preferably I provide suitable means, as hereinafter set forth, whereby the length of the terminal 30 may be varied and whereby the distance between the terminals 32 and 34 may correspondingly be varied. Preferably the construction is such that a change in the length of the terminal 30 automatically and correspondingly increases or decreases the distance between the terminals 32 and 34.

Any suitable means or construction may be provided to effect the breaking of contact at the terminals 29, 30, 30″, 32 and 34. For example, I may employ at each contact, a relay which is energized and de-energized in suitable manner to draw an armature away from each terminal. Any other suitable device may be employed for this purpose.

Leading from the passage 11 is a passage 35 communicating with the valve mechanism 15 as hereinafter set forth, and leading from said valve mechanism are passages 37, 38 respectively communicating with the rotary valve casing 14 of the rotary valve 43 as indicated at 39, 40. The passage 13 which is in communication with the left-hand end of the cylinder 1, is in communication with the rotary valve casing 14 at 41 and the passage 12, which is in communication with the right-hand end of said cylinder 1, is in communication at 42 with said rotary valve casing 14.

The construction of parts is such that air or other motive fluid under pressure is admitted through the passage 35 into the valve mechanism 15 and passing therethrough is admitted by either the passage 37 or the passage 38 to the rotary valve casing 14. Depending upon the position of the rotary valve 43, that is, depending upon its position as shown, or its position at 180° therefrom, neither of which is a neutral position, the motive fluid is admitted through either the passage 12 or the pasage 13, to the cylinder 1, thereby to move the piston 2 to the right or to the left and thus to turn the rudder 8 in a corresponding direction.

Assuming that the rotary valve 43 has been so positioned through the receipt of impulses from the distant control station that the gyroscope 9 is permitted to function in the control of the vessel, and assuming that the vessel departs from its course thereby effecting contact between the arm 22 and the terminal 21, the solenoid 18 is energized so as to move the core or plunger 17 to the left, viewing Fig. 1, and to admit motive fluid through the passages 35, 37, into the rotary valve 43. The position of said valve 43 is such that said motive fluid is admitted into the passage 13 and is thereby conducted into the left-hand end of the cylinder 1, moving the piston 2 and piston-rod 3 toward the right, viewing said figure. Said movement of the piston and piston rod continues until the terminal 30″ is moved beyond the right-hand end of the terminal 30 whereupon the contact is broken and the solenoid 18 is de-energized, whereupon the core or plunger 17 is returned to its former position and the supply of air through the passages 35, 37 and 13 is shut off. At the same time contact is made by the terminal 29 with the terminal 34, thereby effecting energization of the solenoid 19 and thus effecting movement to the right of the core or plunger 17 and the admission of motive fluid to the right-hand end of the cylinder 1 through the passages 35, 38 and 12. The admission of motive fluid into the right-hand end of the cylinder 1 may ensue very rapidly after admission of motive fluid to the left-hand end of said cylinder and I thereby effect the stopping of the motion of the piston 2 and piston rod 3 toward the right and their return movement to the left until the contact is broken at the terminals 29, 34, and is restored at the terminals 30, 30″. If, at this time, the arm 22 of the gyroscope 9 is still in contact with the terminal 21, the described operation is repeated, the motive fluid being admitted first into one end of the cylinder 1 and then into the opposite end thereof until the boat is back upon its true course, whereupon the arm 22 of the gyroscope 9 breaks contact with the terminal 21.

If the vessel departs from its course in the opposite direction and the arm 22 of the gyroscope 9 makes contact with the terminal 24, then the solenoid 19 is energized and the core or plunger 17 is moved to the right, viewing Fig. 1, thereby admitting motive fluid through the passages 35, 38 and 12 into the right-hand end of the cylinder 1, thus moving the piston 2 and piston rod 3 to the left. This motion continues so long as the terminal 30″ makes contact with the terminal 30, but when the terminal 30″ moves beyond the terminal 30, then contact is instantly made between the terminals 29 and 32 and thereupon the solenoid 18 is energized and the core or plunger 17 is moved to the left, thereby instantly admitting motive fluid through the passages 35, 37 and 13 to the left-hand end of the cylinder 1, thus instantly checking the movement of the piston 2 and piston rod 3 toward the left and causing their return toward the right. If the arm 22 of the gyroscope 9 is still in contact with the terminal 24, this operation continues, the piston rod 3 and piston 2 being moved back and forth until the vessel is again upon its true course.

The terminals 32, 34 are preferably at a distance apart corresponding to the length of the terminal 30 so that immediately upon breakage of contact between the terminals 30, 30″, contact is made by the terminal 29 with either the terminal 32 or 34. The result is that at whichever end of the cylinder motive fluid under pressure is admitted to effect movement of the piston 2, motive fluid is promptly admitted at the opposite end of the cylinder so as to check the movement of the piston in the determined direction and to limit, modify or restrict the angle through which the rudder may turn. The rudder when under the control of the gyroscope, may be permitted to move through any suitable angle. Preferably, however, the construction is such that it is limited to a movement of from 2 to 10 degrees, depending upon the distance between the terminals 32, 34, and the length of the terminal 30. In the manner described or in any other suitable manner, the amount of the helm angle may be varied.

In Figs. 1, 4 and 5, and in transverse sections in Figs. 6 to 11 inclusive, I have represented the preferred construction of valve, the positioning of which is determined by the operator at the distant control station. In such figures, the valve casing is represented at 14, it having positioned therein a suitable valve 43 having a spindle 44 extending through the casing. Upon said spindle is loosely mounted a gear 45 and fast thereon is a ratchet 46 with which engages a pawl 47 upon the the gear 45 and held in position by a spring 48. In this or in any other suitable manner the valve 43 is rotated step by step.

I impart a step-by-step movement to said valve 43 by means responsive to the distant control station. For this purpose I have represented in Fig. 3 an open oscillatory circuit 49 this being connected to the winding 50 of closed oscillatory circuit of any suitable type and here shown as having therein a condenser 51, stopping condenser 52 and a suitable detector 53 for electrical oscillations. At 54 I have represented a sensitive relay or other contact making device. These parts may be of any suitable construction not herein necessary more fully to describe or to indicate. At 55 I have represented a circuit controlled by the relay 54 having therein a battery 56, and at 57 I have indicated a solenoid, the core or plunger 58 of which is provided with teeth 59 with which mesh the teeth of the gear 45 whereby, upon energization of the solenoid 57, the rotary valve 43 is moved one step and as herein indicated, through 90 degrees.

The rotary valve 43, as shown most clearly in Figs. 1, 4 and 5, is provided at preferably diametrically opposite points with grooves 60, 61, adapted as shown in Fig. 1, to be placed respectively in connection with the passages 37 39, 41, and 40, 42, thereby as indicated in said figure, permitting the flow of fluid through the passages 37, 13, into the left-hand end of the cylinder 1, or permitting the flow of fluid through the passages 38, 12, into the right-hand end of said cylinder. Between the grooves 60, 61, the said valve 43 is provided with a groove 62 shown in two opposite positions in Figs. 4 and 5. Between its ends the said groove 62 passes from the surfaces of the valve into the inner portion thereof as represented at 63 in said figures. At its inner end the said groove 62 is adapted to be placed in communication with either the passage 13 or the passage 12, depending upon the position of said valve and as represented in Figs. 4 and 5. The opposite or outer end of said groove 62 is in communication with a circumferential groove 66 communicating with the exhaust 67. The said valve 43 is also provided with a longitudinal groove 68 which is in communication with a circumferential groove 69, the latter as represented in Figs. 1, 4 and 5, being in communication with the passage 70 leading from the main fluid supply reservoir 10. Also extending from the circumferential groove 69 is a longitudinal groove 71 which, as shown in Fig. 5, is adapted to be placed in communication with a passage 72 leading to an axial passage 73 in the upper portion 74 of the gyroscope rod, represented as mounted in the case 75. Between the longitudinal grooves 68 and 71 of the rotary valve 43, are two longitudinal grooves 76, 77, both communicating at their outer ends with a circumferential groove 78, itself in communication with the exhaust 79.

The gyroscope rod is herein represented as formed of two parts adapted to be suitably clutched together as represented in Fig. 12. The upper part 74 is enlarged to provide a chamber 80 having a piston 81, the piston rod 82 wherein is surrounded by a coil spring 83 and extends into a hollow head or casing 84 on the lower part 85 of the gyroscope rod and is there provided with a clutching disk 86. The construction is such that when air or other motive fluid under pressure is admitted into the passages 72, 73, the piston 81 is forced downwardly and the clutch disk 86 is forced out of clutching engagement with the surface of the hollow head or casing 84. When, however, air or other motive fluid is permitted to exhaust from the passages 72, 73, then the coil spring 83 lifts the plunger 82 and forces the disk 86 into clutching engagement with the inner surface of the hollow head 84 of the gyroscope rod 85 and also moves the said head into clutching engagement with the under surface 87 of the casing or chamber 80, thereby permitting the gyroscope to function in its control of the vessel. If desired, the clutching surfaces may be roughened or otherwise suitably shaped to insure a clutching engagement of the parts.

The rotary valve 43 herein shown is typical merely of a valve that may be employed for the purpose stated.

In Figs. 1 and 2 I have represented one form of means for modifying, limiting, or restricting the angle through which the rudder is moved when the course of the vessel is controlled by the gyroscope. For this purpose I have, in this embodiment of the invention, provided the valve mechanism 15, herein shown as consisting of a cylinder having mounted therein the solenoid core or plunger 17. The latter, as shown most clearly in Fig. 2, is provided with a piston 88 fast thereon and adapted, when moved to the right or to the left, to admit motive fluid through the passage 35 into the passage 38 or the passage 37. Surrounding the core or plunger 17 are coil springs 89, 90 tending to restore the core or plunger to central position. While any suitable means may be provided for permitting exhaust of the motive fluid from the casing or cylinder of the valve mechanism 15, I have herein represented the core or plunger 17 as longitudinally grooved at 91 and 92. When both solenoids 18 and 19 are deenergized the piston 88 assumes the central position shown in Fig. 2, and exhaust of the motive fluid is permitted through each end of the casing or cylinder.

Assuming that the gyroscope is functioning in the control of the vessel, and that the arm 22 thereof makes contact with the terminal 21, the solenoid 18 will be energized under the conditions hereinbefore set forth and the core or plunger 17 will be moved toward the left, viewing Figs. 1 and 2, thereby permitting compressed motive fluid to pass through the passage 35 and thence through the passage 37 to the rotary valve 43, along the groove 60 thereof, and thence along the passage 13 into the left-hand end of the main or steering cylinder 1, as represented in Fig. 1. This, as previously stated, will cause the piston 2 in said main or steering cylinder to move toward the right, and hence will turn the rudder 8 to port or to the left, viewing the sheet.

If now the compressed air thus admitted to the cylinder 1 were permitted to move the piston through its full stroke, that is to act without restraint, it would move the rudder 8 through a wide angle which, in practice, may approximate 45°. This is open to the objections before pointed out, and in order to prevent such action I have provided modifying, limiting or angle-restricting means, one type of which is herein illustrated. The action thereof is such that the movement of the piston rod 3 toward the right, viewing Fig. 1, will effect deenergization of the solenoid 18 and energization of the solenoid 19, thereby effecting movement of the core or plunger 17 to the right, viewing Figs. 1 and 2. Such movement of the core or plunger 17 at once cuts off the compressed motive fluid that was admitted through the passage 35 to the passage 37. The same movement of the core or plunger to the right admits motive fluid through the said passage 35 to the passage 38, and thence through the passage 61 of the rotary valve 43 and the passage 12 into the right-hand end of the main or steering cylinder 1, thus admitting the motive fluid to the said right-hand end immediately after its admission to the left-hand end as heretofore set forth. Furthermore, the motive fluid which was admitted to the left-hand end of the main or steering cylinder 1 is permitted to exhaust therefrom through the passage 13, the passage 60, the passage 37, and the grooved portion 92 of the solenoid 17.

Thereupon the piston 2 and the piston rod 3 again move toward the left, thus deenergizing the solenoid 19. Such return movement of the piston and piston rod is, however, checked or modified in the manner already described, so that the angle through which the rudder 8 is permitted to move while the gyroscope is functioning, is reduced to the desired extent.

When motive fluid is admitted into the right-hand end of the main or steering cylinder 1 it is immediately, or substantially immediately, admitted into the left-hand end thereof and is permitted to exhaust from the right-hand end thereof through the passages heretofore referred to. Thus, in any case motive fluid, when admitted to one end of the main or steering cylinder, is thereafter promptly admitted at the other end thereof and is exhausted from the end first referred to. The result is that slight or fluctuating movements of the rudder are obtained and the sinuosity of the course of the vessel is very much flattened or reduced.

If the arm 22 of the gyroscope makes contact with the terminal 24, the solenoid 19 is energized and, in a manner similar to that described, the motive fluid is admitted to the right-hand end of the main or steering cylinder and exhausted from the left-hand end thereof, thereby moving the rudder 8 to starboard. Such movement is, however, modified and limited through the action of the described means, as already fully set forth.

It will be evident from the foregoing description that there will or may be a succession of slight movements or fluctuations of the piston rod 3, first in one direction and then in the other, in one end or the other of the steering cylinder 1, when contact is made by the gyroscope arm 22 with the terminal 21 or the terminal 24.

When the gyroscope is functioning as described, in the control of the vessel, the air or other motive fluid under pressure is permitted to exhaust through the passage 72 communicating with the gyroscope as shown in Fig. 12, and hence, passing through the rotary valve 43, is exhausted through the passage 79.

If the operator at the distant control station wishes to assume control of the vessel and to relieve the same from the control of the gyroscope 9, a suitable impulse is sent and the valve 43, which during the control of the vessel by the gyroscope has occupied the position shown in Fig. 1 (or a position at 180° therefrom) is turned through 90° to the position shown in Fig. 4, or to that shown in Fig. 5. Assuming that the valve is turned into the position shown in Fig. 4, it will be observed that the helm or rudder-angle-modifying means shown in Fig. 2 is temporarily rendered inactive, inasmuch as the longitudinal passages 60, 61 of the rotary valve 43 no longer place the passages 39 and 13, and 38 and 12, respectively, in communication. During the control of the vessel from the distant control station, motive fluid is permitted to exhaust through both ends of the valve mechanism 15, as indicated in Fig. 2.

When the rotary valve 43 is in the position shown in Fig. 4, the motive fluid is admitted under pressure directly from the main reservoir 10 through the passage 70, and hence through the cylindrical groove 69 and the longitudinal groove 68, where it is admitted to the passage 72, and hence unclutches the gyroscope and temporarily terminates the functioning thereof. At the same time the motive fluid is admitted from the passage 68 to the passage 12, and hence to the right-hand end of the main or steering cylinder 1, so that the rudder 8 is moved through a wide angle to starboard. At the same time the motive fluid is exhausted from the left-hand end of said steering cylinder through the passage 13, which, as shown in Fig. 4, is in communication through the irregularly shaped passage 62, 63 with the exhaust 67. If, however, the rotary valve 43 be positioned as shown in Fig. 5, then motive fluid under pressure is admitted from the reservoir 10 through the passage 70 and thence through the passage 68 and the passage 13 into the left-hand end of the main or steering cylinder 1. At the same time it is exhausted from the right-hand end thereof through the passage 12 and through the irregularly shaped passage 62, 63 to the exhaust passage 67, whereby the rudder is moved through a wide angle to port.

Upon the termination of steering from the distant control station, the rotary valve 43 is turned through another step, and as herein disclosed through an angle of 90 degrees and the rudder angle-limiting means is again made active, but as the rudder has been moving through the full helm angle during the control of the vessel from the distant control station, the piston rod 3 is or may be at one extreme or the other of its movement. If the position of the piston rod 3 is such that the cross-head 5 occupies its extreme position to the left, contact will be made by the terminal with the terminal 32, thereby energizing the solenoid 18, which will thereupon admit motive-fluid through the valve mechanism 15 and the passages 37 and 13 to the left-hand end of the steering cylinder 1, thereby moving the piston rod 3 to the right until contact is broken at the terminals 29, 32, and contact is made at the terminals 30, 30″. The gyroscope thereupon assumes control of the vessel as heretofore described.

If, upon the termination of the control of the vessel from shore, the cross-head 5 is at the opposite extreme of its movement, a similar action takes place and the piston rod 3 is moved toward the left, viewing said figure.

If desired, and preferably, I provide means whereby I may vary the angle through which the rudder is permitted to move during its control by the gyroscope. While for this purpose I may employ any suitable means, I preferably provide means for moving the contacts 32 and 34 toward and from each other and for correspondingly shortening or lengthening the contact 30. Any suitable means may be provided for this purpose. In Fig. 13 I have represented the contacts 32 and 34 as respectively carried by insulating posts or members 93, 94, which also carry extensible portions 95, 96, of the contact 30, and with which latter sliding contact is adapted to be made. Said posts or members 93, 94 are mounted upon right and left threaded nuts 97, 98, through which passes an adjusting screw 99. The body portion of the contact 30 is mounted at 100 upon an unthreaded portion of the adjusting screw 99. By rotation of the adjusting screw 99 in the proper direction the contacts 32, 34 are moved toward each other and the contact 30, with its extensions 95, 96, is correspondingly shortened. Rotative movement of the adjusting screw in the opposite direction effects further separation of the contacts 32, 34 and elongation of the contact 30. In this or any other suitable manner the degree of movement of the rudder 8 may be varied.

From the foregoing description it will be understood that the course of the vessel or other body controlled by radiant energy may be governed by a suitable controller, and that by said controller such body or vessel may be maintained in a path approximating and approaching, if desired, closely to an exact course.

Having thus described one illustrative embodiment of my invention, I desire it to be understood that although specific terms are employed they are used in a generic and descriptive sense and not for purpose of limitation, the scope of the invention being set forth in the following claims:

1. A system for the control of moving bodies at a distance by radiant energy including, in combination, a body to be propelled, steering means thereon, means active upon said steering means to maintain a predetermined or definite direction of bodily movement of said body, electrically-controlled means to modify the action of said direction-maintaining means upon said steering means, and means operative to overcome the effect of said modifying means and to steer said body selectively through any part of an unlimited angle with respect to said direction.

2. A system for the control of moving bodies at a distance by radiant energy including, in combination, a body to be propelled, steering means thereon, means active upon said steering means to maintain a predetermined or definite direction of bodily movement of said body, make-and-break contact devices to modify the action of said direction-maintaining means upon said steering means, and means operative to overcome the effect of said modifying means and to steer said body selectively through any part of an unlimited angle with respect to said direction.

3. A system for the control of moving bodies at a distance by radiant energy including, in combination, a body to be propelled, steering means thereon, means active upon said steering means to maintain a predetermined or definite direction of bodily movement of said body, and electrical connections operated by movement of the steering means to modify the action of said direction-maintaining means upon said steering means.

4. A system for the control of moving bodies at a distance by radiant energy including, in combination, a body to be propelled, steering means thereon, means active upon said steering means to maintain a predetermined or definite direction of bodily movement of said body, and electrically-controlled means to reduce the angular movement of said steering means below that which would be imposed by the normal action of said direction-maintaining means.

5. A system for the control of moving bodies at a distance by radiant energy including, in combination, a body to be propelled, steering means thereon, means active upon said steering means to maintain a predetermined or definite direction of bodily movement of said body, and make-and-break contact devices to reduce the angular movement of said steering means below that which would be imposed by the normal action of said direction-maintaining means.

6. A system for the control of moving bodies at a distance by radiant energy including, in combination, a body to be propelled, steering means thereon, means active upon said steering means to maintain a predetermined or definite direction of bodily movement of said body, and electrical connections operated by the movement of the steering means to reduce the angular movement of said steering means below that which would be imposed by the normal action of said direction-maintaining means.

7. A system for the control of moving bodies at a distance by radiant energy including, in combination, a body to be propelled, steering means thereon, means active upon said steering means to maintain a predetermined or definite direction of bodily movement of said body, electrically-controlled means to modify the action of said direction-maintaining means upon the steering means, and means responsive to radiant energy from a distance to control the action of said modifying means.

8. A system for the control of moving bodies at a distance by radiant energy including, in combination, a body to be propelled, steering means thereon, means active upon said steering means to maintain a predetermined or definite direction of bodily movement of said body, electrical connections operated by movement of the steering means to modify the action of said direction-maintaining means upon said steering means, and means responsive to radiant energy from a distance to control the action of said modifying means.

9. A system for the control of moving bodies at a distance by radiant energy including, in combination, a body to be propelled, steering means thereon, means active upon said steering means to maintain a predetermined or definite direction of bodily movement of said body, electrically controlled means to reduce the angle of movement of said steering means below that which would be imposed by the normal action of said direction-maintaining means, and means responsive to radiant energy from a distance to control the action of said angle-reducing means.

10. A system for the control of moving bodies at a distance by radiant energy including, in combination, a body to be propelled, steering means thereon, means active upon said steering means to maintain a predetermined or definite direction of bodily movement of said body, electrical connections operated by movement of the steering means to reduce the angle of movement of said steering means below that which would be imposed by the normal action of said direction-maintaining means, and means responsive to radiant energy from a distance to control the action of said angle-reducing means.

11. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, and electrically controlled means governing the action of said fluid pressure-actuated-modifying means.

12. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, and make-and-break contact devices to modify the action of said direction-maintaining means upon said steering means.

13. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, and electrical connections operated by movement of the steering means to modify the action of said direction-maintaining means upon said steering means.

14. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, electrically-controlled means governing the action of said fluid pressure-actuated-modifying means, and means responsive to radiant energy from a distance to control the action of said fluid pressure-actuated-modifying means.

15. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, make-and-break contact devices to modify the action of said direction-maintaining means upon said steering means, and means responsive to radiant energy from a distance to control the action of said fluid pressure-actuated-modifying means.

16. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, electrical connections operated by movement of the steering means to modify the action of said direction-maintaining means upon said steering means, and means responsive to radiant energy from a distance to control the action of said fluid-pressure-actuated-modifying means.

17. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, make-and-break contact devices controlled by the action of the steering means to modify the action of said direction-maintaining means upon the steering means, and solenoids adapted to be energized by said contact devices to operate said fluid pressure-actuated-modifying means.

18. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, make-and-break contact devices controlled by the action of the steering means to modify the action of said direction-maintaining means upon the steering means, and solenoids adapted to be energized by said contact devices to operate said fluid pressure-actuated-modifying means, the latter having a plunger constituting a core for said solenoids.

19. A system for the control of moving bodies at a distance by radiant energy including, in combination, a body to be propelled, steering means thereon, means active upon said steering means to maintain a predetermined or definite direction of bodily movement of said body, fluid pressure means to modify the action of said direction-maintaining means upon the steering means, make-and-break contact devices controlled by the action of the steering means to modify the action of said direction-maintaining means upon the steering means, and solenoids adapted to be energized by said contact devices to operate said fluid pressure-actuated-modifying means, the latter comprising a valve casing, and a plunger therein constituting a core for said solenoids.

20. A system for controlling the operation of moving bodies at a distance by radiant energy including, in combination, a body to be propelled, steering means thereon, a gyroscope, fluid pressure means controlled by said gyroscope to govern the action of said steering means, and electrically controlled means operated by the movement of said steering means to modify the action of said gyroscope upon the steering means.

21. A system for controlling the operation of moving bodies at a distance by radiant energy including, in combination, a body to be propelled, steering means thereon, a gyroscope, fluid pressure means controlled by said gyroscope to govern the action of said steering means, and make-and-break contact devices operated by the movement of said steering means to modify the action of said direction-maintaining means upon said steering means.

22. A system for controlling the operation of moving bodies at a distance by radiant energy including, in combination, a body to be propelled, steering means thereon, a gyroscope, fluid pressure means controlled by said gyroscope to govern the action of said steering means and electrical connections operated by movement of the steering means to modify the action of said direction-maintaining means upon said steering means.

23. A system for controlling the operation of moving bodies at a distance by radiant energy including, in combination, a body to be propelled, steering means thereon, a gyroscope, fluid pressure means controlled by said gyroscope to govern the action of said steering means, make-and-break contact devices controlled by the movement of the steering means to modify the action of said direction-maintaining means upon the steering means, and solenoids adapted to be energized by said contact devices to operate said fluid pressure-actuated-modifying means.

24. A system for controlling the operation of moving bodies at a distance by radiant energy including, in combination, a body to be propelled, steering means thereon, a gyroscope, fluid pressure means controlled by said gyroscope to govern the action of said steering means, make-and-break contact devices controlled by the movement of the steering means to modify the action of said direction-maintaining means upon the steering means, and solenoids adapted to be energized by said contact devices to operate said fluid pressure-actuated-modifying means, the latter having a plunger constituting a core for said solenoids.

25. A system for controlling the operation of moving bodies at a distance by radiant energy including, in combination, a body to be propelled, steering means thereon, a gyroscope, fluid pressure means controlled by said gyroscope to govern the action of said steering means, electrically controlled means controlled by said steering means to modify the action of said gyroscope upon the steering means, and means responsive to radiant energy from a distance to control the action of said modifying means.

26. A system for controlling the operation of moving bodies at a distance by radiant energy including, in combination, a body to be propelled, steering means thereon, a gyroscope, fluid pressure means controlled by said gyroscope to govern the action of said steering means, make-and-break contact devices controlled by said steering means to modify the action of said direction-maintaining means upon said steering means, and means responsive to radiant energy from a distance to control the action of said modifying means.

27. A system for controlling the operation of moving bodies at a distance by radiant energy including, in combination, a body to be propelled, steering means thereon, a gyroscope, fluid pressure means controlled by said gyroscope to govern the action of said steering means, electrical connections operated by movement of the steering means to modify the action of said direction-maintaining means upon said steering means, and means responsive to radiant energy from a distance to control the action of said modifying means.

28. A system for controlling the operation of moving bodies at a distance by radiant energy including, in combination, a body to be propelled, steering means thereon, a gyroscope, fluid pressure means controlled by said gyroscope to govern the action of said steering means, fluid pressure means to modify the action of said gyroscope upon said steering means, and electrically controlled means governing the action of said fluid pressure-controlled-modifying means.

29. A system for controlling the operation of moving bodies at a distance by radiant energy including, in combination, a body to be propelled, steering means thereon, a gyroscope, fluid pressure means controlled by said gyroscope to govern the action of said steering means, fluid pressure means to modify the action of said gyroscope upon said steering means, and make-and-break contact devices to modify the action of said direction-maintaining means upon said steering means.

30. A system for controlling the operation of moving bodies at a distance by radiant energy including, in combination, a body to be propelled, steering means thereon, a gyroscope, fluid pressure means controlled by said gyroscope to govern the action of said steering means, fluid pressure means to modify the action of said gyroscope upon said steering means, and electrical connections operated by movement of the steering means to modify the action of said direction-maintaining means upon said steering means.

31. A system for controlling the operation of moving bodies at a distance by radiant energy including, in combination, a body to be propelled, steering means thereon, a gyroscope, fluid pressure means controlled by said gyroscope to govern the action of said steering means, valve means to modify the action of said gyroscope upon said steering means, and electrically controlled means governing the action of said fluid pressure-controlled-modifying means.

32. A system for controlling the operation of moving bodies at a distance by radiant energy including, in combination, a body to be propelled, steering means thereon, a gyroscope, fluid pressure means controlled by said gyroscope to govern the action of said steering means, valve means to modify the action of said gyroscope upon said steering means, and make-and-break contact devices to modify the action of said direction-maintaining means upon said steering means.

33. A system for controlling the operation of moving bodies at a distance by radiant energy including, in combination, a body to be propelled, steering means thereon a gyroscope, fluid pressure means controlled by said gyroscope to govern the action of said steering means, valve means to modify the action of said gyroscope upon said steering means, and electric connections operated by movement of the steering means to modify the action of said direction-maintaining means upon said steering means.

34. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, and electrically controlled means governing the action of said helm angle-reducing means.

35. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, and make-and-break contact devices to modify the action of said helm angle-reducing means.

36. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, and electrical connections operated by movement of the steering means to modify the action of said helm angle-reducing means.

37. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, electrically-controlled means governing the action of said helm angle-reducing means, and means responsive to radiant energy from a distance to control the action of said helm angle-reducing means.

38. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, make-and-break contact devices to modify the action of said helm angle-reducing means, and means responsive to radiant energy from a distance to control the action of said helm angle-reducing means.

39. A system for controlling the operation of moving bodies at a distance by radiant energy including, in combination, a body to be propelled, steering means thereon, a gyroscope, fluid pressure means controlled by said gyroscope to govern the action of said steering means, helm angle-reducing means between the gyroscope and the steering means, electrical connections operated by movement of the steering means to modify the action of said helm angle-reducing means, and means responsive to radiant energy from a distance to control the action of said helm angle-reducing means.

40. A system for controlling the operation of moving bodies at a distance by radiant energy including, in combination, a body to be propelled, steering means thereon, fluid pressure means, means active upon said fluid pressure means to maintain a predetermined or definite direction of bodily movement of said body, and electrically controlled means to effect the steering of said body selectively through any part of an unlimited arc.

41. A system for the control of moving bodies at a distance by radiant energy including, in combination, a body to be propelled, steering means thereon, fluid pressure means to control said steering means, a gyroscope governing the action of said fluid pressure means, electrically-controlled means to modify the normal action of said gyroscope upon said steering means, and step-by-step means responsive to radiant energy from a distance to control the action of said modifying means.

42. A system for the control of moving bodies at a distance by radiant energy including, in combination, a body to be propelled, steering means thereon, fluid pressure means to control said steering means, a gyroscope governing the action of said fluid pressure means, electrically-controlled means to modify the normal action of said gyroscope upon said steering means, and a rotary valve having actuating means responsive to radiant energy from a distance to control the action of said modifying means.

43. A system for controlling the operation of moving bodies at a distance by radiant energy including, in combination, a body to be propelled, steering means thereon and including a fluid pressure receiving chamber having a piston, means for admitting and for exhausting motive fluid from each side of the piston in said chamber, a gyroscope controlling such admission and exhaust, and electrically-controlled means including a stationary electrical contact and a movable electrical contact cooperating therewith and actuated by said steering means to modify the action of said gyroscope in its control of said admission and exhaust.

44. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, and electrically-controlled means to effect fluctuating action of said piston and thereby to limit the helm angle.

45. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, and make-and-break contact devices to effect fluctuating action of said piston and thereby to limit the helm angle.

46. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, and electrical connections operated by movement of the steering means thereby to effect fluctuating action of said piston, and thereby to limit the helm angle.

47. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, electrically-controlled means to effect fluctuating action of said piston and thereby to limit the helm angle, and means responsive to radiant energy to control the action of said means for effecting fluctuating action of the piston.

48. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, make-and-break contact devices to effect fluctuating action of said piston and thereby to limit the helm angle, and means responsive to radiant energy to control the action of said means for effecting fluctuating action of the piston.

49. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, electrical connections operated by movement of the steering means thereby to effect fluctuating action of said piston, and thereby to limit the helm angle, and means responsive to radiant energy to control the action of said means for effecting fluctuating action of the piston.

50. A system for controlling the operation of moving bodies at a distance by radiant energy including, in combination, a body to be propelled, steering means thereon and including a fluid pressure receiving chamber having a piston, means for admitting and for exhausting motive fluid to and from each side of the piston in said chamber, a gyroscope controlling such admission and exhaust, and electrically operated means under the control of radiant energy from a distance to impose fluctuating movement upon said piston.

51. A system for controlling the operation of moving bodies at a distance by radiant energy including, in combination, a body to be propelled, steering means thereon including a fluid pressure receiving chamber having a piston, means for admitting and for exhausting motive fluid to and from each side of the piston in said chamber, a gyroscope controlling such admission and exhaust, electrically-operated means to impose fluctuating movements upon said piston while the body is controlled by the gyroscope, and means responsive to radiant energy from a distance to terminate the function of said gyroscope.

52. A system for controlling the operation of moving bodies at a distance by radiant energy including, in combination, a body to be propelled, steering means thereon and including a fluid pressure receiving chamber having a piston and having fluid connections to opposite sides thereof, direction-maintaining means controlling the admission of motive fluid to each side of said chamber, and electrically controlled means to admit motive fluid to that side of the chamber opposite that to which motive fluid is admitted by the controlling action of said direction-maintaining means.

53. A system for controlling the operation of moving bodies at a distance by radiant energy including, in combination, a body to be propelled, steering means thereon and including a fluid pressure receiving chamber having a piston and having fluid connections to opposite sides thereof, a gyroscope controlling the admission of motive fluid to each side of said chamber, and electrically-operated means controlled by the movement of said piston to admit motive fluid to the side of said piston opposite that at which it is admitted by the controlling action of said gyroscope.

54. A system for controlling the operation of moving bodies at a distance by radiant energy including, in combination, a body to be propelled, steering means thereon and including a fluid pressure receiving chamber having a piston and having fluid connections to opposite sides thereof, a gyroscope controlling the admission of motive fluid to each side of said chamber, and make-and-break contact devices controlled by the movement of said piston to admit motive fluid to the side of said piston opposite that at which it is admitted by the controlling action of said gyroscope.

55. A system for controlling the operation of moving bodies at a distance by radiant energy including, in combination, a body to be propelled, steering means thereon and including a fluid pressure receiving chamber having a piston and having fluid connections to opposite sides thereof, a gyroscope controlling the admission of motive fluid to each side of said chamber, and electrically-controlled means operated by movement of said piston quickly to exhaust motive fluid from that side of the piston to which it was admitted by the governing action of said gyroscope, and quickly to admit motive fluid at the opposite side of said piston thereby to limit the helm angle.

56. The combination with a movable body, of means carried thereby and automatically operative to stabilize said body with respect to a given axis, and electrically controlled means operative to limit the automatic action of said stabilizing means.

57. The combination with a movable body, of automatic means carried thereby to stabilize said body with respect to a given axis, electrically controlled means operative to restrict the effective action of said automatic means on said body, and means responsive to energy transmitted from a distant point to modify the automatic control of said body by said stabilizing means and said restricting means, and to rotate said body selectively about said axis either in one direction or in an opposite direction.

58. The combination with a movable body, of automatic means carried thereby to stabilize said body with respect to a given axis, electrically controlled means operative to restrict the effective action of said automatic means on said body, and means responsive to energy transmitted from a distant point to modify the automatic control of said body by said stabilizing means and said restricting means, and to rotate said body selectively about said axis through any part of an unlimited angle.

59. The combination with a movable body, of automatic means carried thereby to stabilize said body with respect to a given axis, electrically controlled means operative to restrict the effective action of said automatic means on said body, and means responsive to energy transmitted from a distant point to terminate the automatic control of said body by said stabilizing means and said restricting means, and to rotate said body selectively either in one direction or in an opposite direction.

60. The combination with a movable body, of automatic means including a gyroscope carried thereby to stabilize said body with respect to a given axis, means controlled by electricity and operative to restrict the effective action of said gyroscope on said body, and means responsive to radiant energy transmitted from a distant point to modify the control of said body by said stabilizing means and said restricting means, and to rotate said body about said axis selectively either in one direction or in an opposite direction.

61. The combination with a movable body, of steering means thereon, means automatically acting upon said steering means to maintain a predetermined direction of movement of said body, and electrically controlled means controlled by the action of said steering means to modify the action of said direction-maintaining means upon said steering means.

62. A system for controlling the operation of moving bodies at a distance by radiant energy including, in combination, a body to be propelled, steering means thereon and including a fluid pressure receiving chamber having a piston and having fluid connections to opposite sides thereof, a gyroscope controlling the admission of motive fluid to each side of said chamber, and means controlled by movement of said piston to admit motive fluid to the side of said piston opposite that at which it is admitted by the controlling action of said gyroscope.

63. A system for controlling the operation of moving bodies at a distance by radiant energy including, in combination, a body to be propelled, steering means thereon and including a fluid pressure receiving chamber having a piston and having fluid connections to opposite sides thereof, a gyroscope controlling the admission of motive fluid to each side of said chamber, and means operated by movement of said piston quickly to admit motive fluid to said chamber at the side thereof opposite to that at which motive fluid is admitted by the controlling action of said gyroscope, thereby to limit the helm angle.

In testimony whereof, I have signed my name to this specification, in the presence of two subscribing witnesses.

JOHN HAYS HAMMOND, JR.

Witnesses:
  JOHN P. KOEHLER,
  F. J. BEHR.